May 23, 1939.　　　　R. W. HOAG　　　　2,159,378
FOLDING BOX
Filed Oct. 16, 1936　　　3 Sheets-Sheet 1
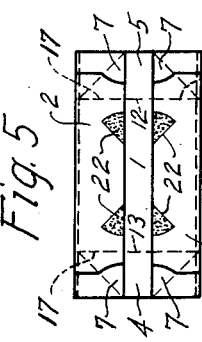
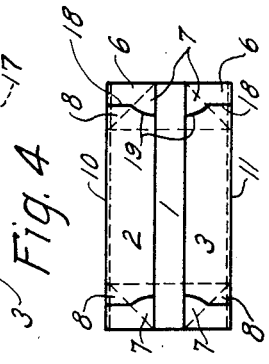
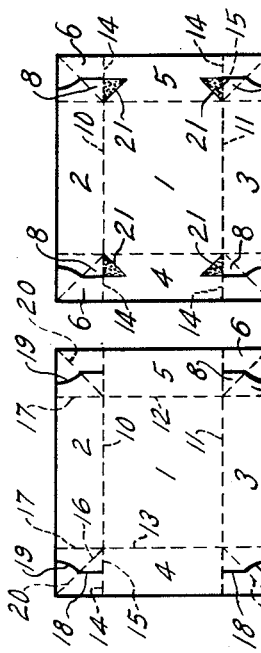
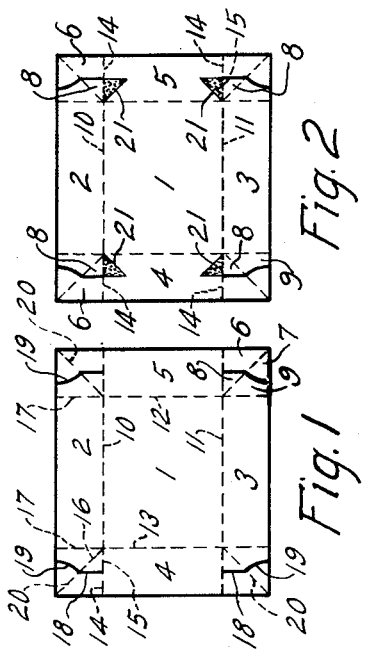
Inventor
Roderick Wm Hoag May 23, 1939.    R. W. HOAG    2,159,378
FOLDING BOX
Filed Oct. 16, 1936    3 Sheets-Sheet 2
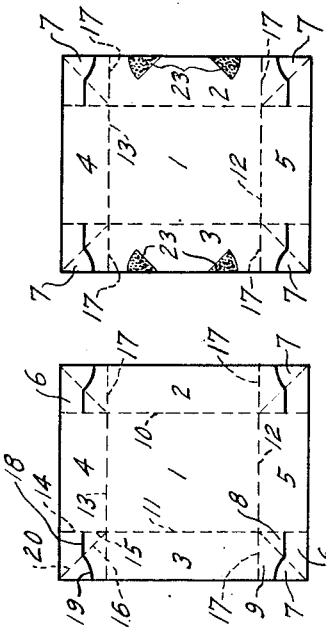
Inventor
Roderick Wm Hoag Inventor
Roderick Wm Hoag Patented May 23, 1939

2,159,378

UNITED STATES PATENT OFFICE 2,159,378

FOLDING BOX

Roderick W. Hoag, Melrose, Mass.

Application October 16, 1936, Serial No. 105,982

3 Claims. (Cl. 229—31)

The invention relates to improvements in folding boxes of the type which automatically lock the walls thereof in upright position upon being brought to such position.

An object of this invention is to provide a paper box from a blank which will require the least possible cutting in order to form the box in collapsed condition.

Another object of this invention is to provide self-locking folded boxes having strong, tight corners.

Another and important object of this invention is to provide a box of the character described which may be manufactured economically and at a high rate of speed.

The box herein described may be formed, in collapsed condition, from a cut and scored blank, by applying adhesive thereto and performing simple folding operations.

With said objects in view, and others hereinafter explained, my invention consists in the folding box hereinafter described and claimed.

Of the accompanying drawings:

Figure 1 is a plan view of the blank from which the box may be formed.

Figure 2 is a plan view of the blank showing areas to which adhesive may be applied in making the box.

Figure 3 is a plan view of the blank showing the condition thereof after the front and rear margins of the blank have been folded against the center area of the blank.

Figure 4 is similar to Fig. 3 except that areas are shown to which adhesive may be applied in making the box.

Figure 5 is a plan view of the completed box in flat condition.

Figure 6 is a plan view of the box in set up form.

Figure 7 is a front elevation of the box shown in Fig. 6.

Figure 8 is an end elevation of the box shown in Fig. 7.

Figure 9 is the same as Fig. 1, except that it is shown turned at an angle of 90°.

Figures 10 to 13 inclusive, illustrate the progressive steps of a method of making a modified form of box from a blank shown in Fig. 9.

Figure 14 is a plan view of the box shown in Fig. 13, after the box has been set up Figure 15 is a front elevation of the box shown in Fig. 14.

Figure 16 is an end elevation of the box shown in Fig. 15.

Figure 17:
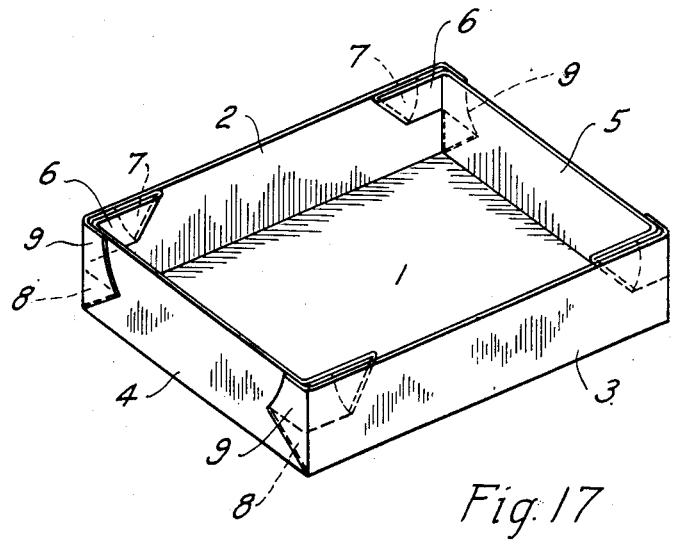

Figure 17 is a perspective view of the box shown in Figs. 14, 15 and 16, tilted so as to show a portion of the interior thereof.

Figure 18:
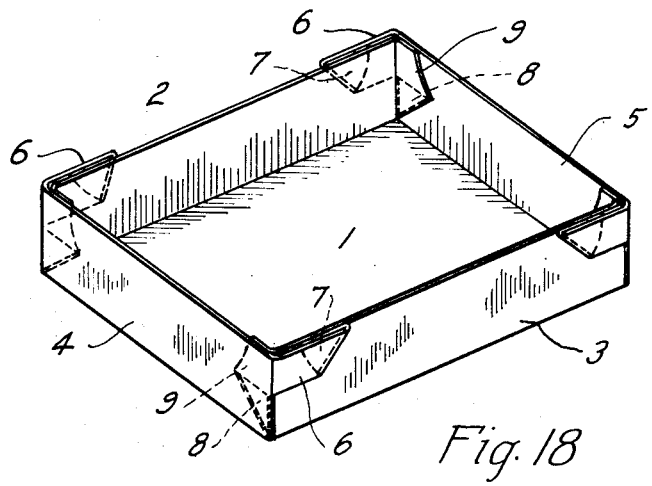

Figure 18 is a perspective view of the box shown in Figs. 6, 7 and 8, tilted so as to show a portion of the interior thereof.

Referring to Fig. 1, there is illustrated a cut and scored blank of suitable material, such as paper box board, scored lines are represented by dash lines, 10 to 17 inclusive and 20, and cut lines are represented by lines 18 and 19. The said score lines and cut lines effect a division of the blank to form a bottom section 1 for the box, a rear wall section 2, a front wall section 3, end wall sections 4 and 5, end wall flaps 6, end wall flap extensions 7, end wall corner segments 8, and front and rear wall corner segments 9. Said corner segments form a bellows fold element at each corner of the box.

In producing the box in collapsed condition from a cut and scored blank (Fig. 1), predetermined areas 21 (Fig. 2) are treated with adhesive so that when the blank is folded on lines 10, 11, 14 and 15 (Figs. 1, 2 and 3) the end wall corner segments 8 will contact the adhesively treated areas 21 (Fig. 2). After said folding operation the blank is in the condition illustrated by Fig. 3. The upward facing surfaces of the front and rear wall sections 3 and 2 (Fig. 4) are then adhesively treated at predetermined areas 22. The end wall sections 4 and 5 together with the front and rear wall corner segments are then folded on lines 12, 13 and 17, thus causing the end wall flap extensions 7 to contact the adhesively treated areas 22, to complete the box in collapsed condition ready to be instantly set up for use.

When it is desired to set up the box for use, the front and rear walls 3 and 2 are simply raised and bent outward, whereupon the front and rear wall corner segments 9 in each corner will automatically snap into position parallel with the corresponding end wall section, thus automatically locking and keeping the box in upright position, the said corner segments constituting keepers for the purpose.

The form of construction and the method of making the box illustrated in Figs. 9 to 17 inclusive, is the same as that illustrated in Figs. 1 to 8 inclusive and Fig. 18, except that the end wall flap extensions 7 are secured to the inside of the box and the end wall corner segments 8 are secured to the outside of the box. In producing a box of this construction a blank Figure 9, which is identical to the blank shown in Figure 1, is adhesively treated at predetermined areas 23 (Fig. 10), the blank is then folded on lines 12, 13 and 17 with the result that end wall flap extensions 7 will contact the adhesively treated areas 23. The blank is then in the condition illustrated by Figure 11. Adhesive is then applied to predetermined areas 24 (Fig. 12) on the upward facing surfaces of the end walls 5 and 4. The blank is then folded on lines 10, 11, 14 and 15, with the result that end wall corner segments 8 will contact the adhesively treated areas 24, thus completing the box in collapsed condition.

While I have illustrated and described the preferred forms of construction for carrying my invention into effect, these are capable of variation and modification without departing from the spirit of the invention.

I have shown the cut lines 18 and 19 (Figs. 1 and 9) as the preferred form of cuts to be provided in the blank, but the cuts may be varied without departing from my invention. Said cuts may be in the form of one straight line extending from each end of the end wall sections or the cuts may be curved or irregular in shape, provided they extend from the ends of the end wall sections and intersect the scored lines extending from the adjacent corner of the bottom section to the corresponding outside corner of the blank at each of the four corners.

The score lines 11, 14 and 15 are shown as being in one straight line (Figs. 1 and 9) as are score lines 13 and 17, also score lines 16 and 20 are shown as one straight line. These score lines are illustrated in this way for simplicity, but in practice it may be desirable, when fairly thick material is used, to have some of the lines slightly out of line with each other, or at a slight angle with each other, to compensate for the thickness of the material from which the box blank is made in order to permit folding the walls and corners of the box to flat condition and so that the box may be set up without binding or cramping.

Instead of applying adhesive to areas 21 (Fig. 2), 22 (Fig. 4), 23 (Fig. 10) and 24 (Fig. 12), the adhesive may be applied directly to the corner segments 8 and flap extensions 7, without departing from the spirit of my invention.

I have shown as a preferred embodiment of my invention that end wall corner segments 8 should be secured to the inside of end walls 4 and 5 at areas 21 (Fig. 2), but it is not necessary that said corner segments 8 be so secured, because the box will be effective for many uses without being so secured.

Having described my invention, what I claim is:

1. A folding box comprising a bottom, upright front and rear walls and end walls, the said end walls being provided at each end thereof with an extension and each extension being provided with a flap folded against said extension on a line radiating substantially from the apex of the corner of the bottom and secured to the outside surface of the corresponding front or rear wall; a bellows fold element at each corner of the box being integral with a portion of the end edge of the end wall and with the corresponding end edge of the front or rear wall, one surface of said bellows fold element being secured to the inside surface of the end wall, substantially as described.

2. A folding box comprising a bottom, upright front and rear walls and end walls, the said end walls being provided at each end thereof with an extension and said extension being provided with a flap folded against said extension on a line radiating substantially from the apex of the corner of the bottom and secured to the inside surface of the corresponding front or rear wall; a bellows fold element at each corner of the box being integral with a portion of the end edge of the end wall and with the corresponding end edge of the front or rear wall, one surface of said bellows fold element being secured to the outside surface of the end wall, substantially as described.

3. A folding box comprising a bottom, upright front and rear walls and end walls, the said end walls being provided at each end thereof with an extension and each extension being provided with a flap folded against said extension on a line radiating substantially from the apex of the corner of the bottom and secured to the outside surface of the corresponding front or rear wall; a bellows fold element at each inside corner of the box being integral with a portion of the end edge of the end wall and with the corresponding end edge of the front or rear wall.

RODERICK WM. HOAG.